(No Model.)
G. E. BURT.
SHAFT COUPLING.
No. 443,895. Patented Dec. 30, 1890.
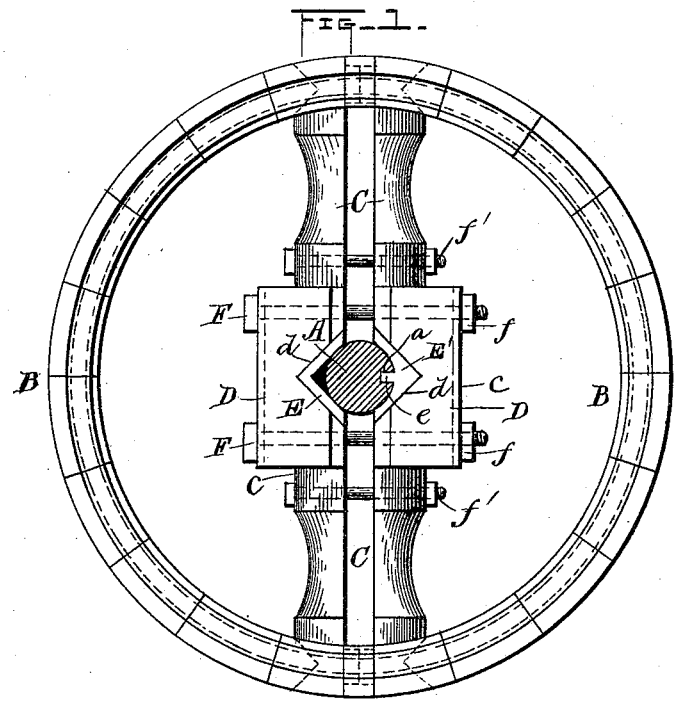
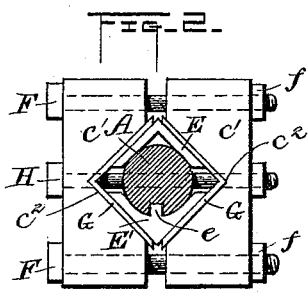
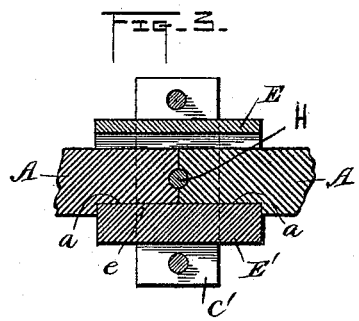
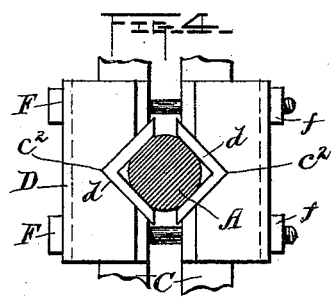
Witnesses:
Severance
P. W. Deane
Inventor:
George E. Burt,
By L. Deane,
his Attorney.

UNITED STATES PATENT OFFICE.

GEORGE E. BURT, OF HARVARD, MASSACHUSETTS.

SHAFT-COUPLING.

SPECIFICATION forming part of Letters Patent No. 443,895, dated December 30, 1890.

Application filed July 18, 1889. Serial No. 317,909. (No model.)

*To all whom it may concern:*

Be it known that I, GEORGE E. BURT, a citizen of the United States, residing at Harvard, in the county of Worcester and State of Massachusetts, have invented certain new and useful Improvements in Shaft-Couplings; and I do hereby declare the following to be a full, clear, and exact description of the invention, such as will enable others skilled in the art to which it appertains to make and use the same.

The invention relates to improvements in shaft-couplings, the object being to couple the parts of a shaft broken transversely, or, if desired, the meeting ends of two similar aligned shafts, by means of side blocks and attachments, which blocks may form parts of the compound spoke of a sectioned pulley; and it consists in the construction and novel combination of parts hereinafter described, and pointed out in the claims hereto appended.

By means of this coupling a shaft that breaks at a point adjoining a pulley mounted thereon can quickly have its parts secured together without dismounting the shaft, thus saving cost, time, and labor.

In the accompanying drawings, in which similar letters of reference indicate similar parts, Figure 1 is a side view of a shaft-coupling embodying the invention and of a pulley attached thereto. Fig. 2 is a side view of a modification thereof, the pulley not being attached. Fig. 3 is a central vertical longitudinal section of the same. Fig. 4 is a view similar to Fig. 1, (without the pulley,) but with the ribs and grooves dispensed with and the sides of the shaft flattened.

Referring to the drawings by letter, A A designate the meeting sections of a broken shaft or the meeting ends of two aligned shafts (see Fig. 3) having the longitudinal aligned recesses $a$ $a$, which act as seats for a rib or key, hereinafter described.

$c'$ $c'$ designate two rectangular side blocks, which may be the central portions of the sections $c$ $c$ of a compound spoke C of a pulley B. The said blocks have in their flat facing sides the large central transverse grooves or slots $c^2$, which have flat sides that meet each other at right angles. The blocks $c'$ have their outer longitudinal edges re-enforced by angle-plates D, provided in their edges with rectangular notches $d$, registering with the adjacent ends of the grooves or seats $c^2$ and of equal size thereto.

E E' are angular clamping-plates, in which the ends of the shafts A A are seated, and which fit, respectively, in the opposite grooves or seats $c^2$ and notches $d$, and extend on each side a suitable distance beyond the blocks $c'$ $c'$. The clamping-plate E' is provided at its inner angle with the rib or flange $e$, that enters the recesses or seats $a$ in the approximated shaft-sections A and prevents the blocks $c'$ from turning on the shaft, thus serving the purpose of a key.

F F are bolts which pass through openings in the angle-plates D and in the blocks $c'$, and have their threaded ends engaged by nuts $f$ on one side. The said bolts are preferably situated at equal distances on each side of the shafts. It is evident that when the blocks $c'$ are drawn together tightly by means of said bolts the angle-plates or seats E E' will be forced tightly against the shafts, keeping them aligned, and the rib $e$ will prevent them from turning in said plates either together or separately. If the blocks $c'$ form parts of a compound spoke of a pulley, other bolts $f'$ may be passed through the spoke-sections farther out than the bolt $f$ on each side.

Instead of the grooves $a$ and rib $e$, the sides of the shaft-sections may be merely flattened with a file or rasp, so that the inner surfaces of the angular clamping-plates will fit thereagainst, as seen in Fig. 4.

The allusion to the blocks $c'$ as forming parts of the spoke-sections of a divided pulley is because the coupling is particularly intended and adapted to mend or couple a shaft that breaks at a point adjoining a pulley with little trouble or expense.

Figs. 2 and 3 show a modification in which the angle-clamping plates E E' are arranged with their angles between the blocks $c'$ and outer ang'e clamping-plates G fit in the grooves $c^2$ and notches $d$, the said outer plates binding on the inner plates, which bind on the shafts in the described manner. A central bolt H, in this modification, passes through openings in the blocks $c'$ and in the angles of the plates G, passing between the edges of the inner clamping-plates E E', and the meeting ends of the shafts or shaft-sections are preferably bored, as shown in Fig. 3, to permit the bolt H to pass while said ends are in contact. The latter modification may be stronger than the former, which is, however, more simple and easily constructed.

It is evident from the foregoing that by means of a single groove or seat in a single shaft and rib or key *e* the device may be used simply to key or secure a pulley on said shaft.

The herein-described coupling is very effective and often saves much time and labor, as when a shaft breaks it need not be dismounted from the hangers, but may be grooved or its sides slightly flattened, as shown in Fig. 4, and a coupling constructed as described may be attached. If a shaft breaks at a point adjoining a pulley, which is the most frequent point of fracture, the compound spoke of the pulley takes the place of the blocks *c'*.

Having described my invention, I claim—

1. In a shaft-coupling, the combination, with the two meeting shaft-sections provided with longitudinal aligned recesses meeting end to end, so as to be continuous, of the opposite angular clamp-plates, one of which has a rib *e* standing inward from its inner angle and fitting snugly into the aligned continuous recesses in the shaft, and means, substantially as described, whereby the said angular clamp-plates are forced against the shaft-sections, as specified.

2. In a shaft-coupling, the combination, with the two meeting shaft-sections, of the opposite angular clamping-plates, the blocks grooved to form seats for said clamp-plates, the re-enforcing angle-plates on the outer longitudinal edges of said blocks, and the bolts passing through openings in said re-enforcing plates and blocks on each side of the clamp-plates and binding said blocks together, substantially as specified.

3. In a shaft-coupling, the combination, with the recessed shaft-sections, of the ribbed angle clamp-plate, the unribbed angle clamp-plate, the blocks grooved to receive said angle clamp-plates, the re-enforcing angle-plates on the outer longitudinal edges of said blocks, and the bolts binding the blocks together, substantially as specified.

4. In a shaft-coupling, the combination, with the recessed shaft-sections, of the inner clamping-plates E E', the latter having the rib or key *e*, the outer clamping-plates G, the blocks grooved to receive the plates G, and the bolts F and H, all constructed and arranged substantially as and for the purpose specified.

In testimony whereof I affix my signature in presence of two witnesses.

GEORGE E. BURT.

Witnesses:
CLARK A. BATCHELDER,
FRANK J. MALONEY.